United States Patent
Pavlas et al.

(10) Patent No.: US 9,471,350 B2
(45) Date of Patent: Oct. 18, 2016

(54) LIVE MIGRATION OF VIRTUALIZED SYSTEMS

(71) Applicant: Intel Corporation, Santa Clara, CA (US)

(72) Inventors: Chris Pavlas, Hillsboro, OR (US); Duke C. Hong, Hillsboro, OR (US); Scott P. Dubal, Beaverton, OR (US); Elizabeth M. Kappler, Hillsboro, OR (US); Patrick Connor, Beaverton, OR (US); Matthew A. Jared, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 14/037,814

(22) Filed: Sep. 26, 2013

(65) Prior Publication Data

US 2015/0088586 A1 Mar. 26, 2015

(51) Int. Cl.
*G06F 9/455* (2006.01)
*G06Q 10/06* (2012.01)

(52) U.S. Cl.
CPC ....... *G06F 9/45533* (2013.01); *G06F 9/45558* (2013.01); *G06Q 10/06315* (2013.01); *G06F 2009/4557* (2013.01)

(58) Field of Classification Search
USPC .......................................................... 718/1
See application file for complete search history.

(56) References Cited

U.S. PATENT DOCUMENTS

| | | | |
|---|---|---|---|
| 9,098,214 B1* | 8/2015 | Vincent | G06F 8/10 |
| 2006/0195715 A1* | 8/2006 | Herington | G06F 9/5077 714/4.2 |
| 2009/0055507 A1* | 2/2009 | Oeda | G06F 9/4856 709/216 |
| 2009/0276771 A1* | 11/2009 | Nickolov | G06F 9/4856 717/177 |
| 2011/0107332 A1* | 5/2011 | Bash | G06F 1/206 718/1 |
| 2014/0047201 A1* | 2/2014 | Mehta | G06F 13/00 711/158 |
| 2014/0165063 A1* | 6/2014 | Shiva | G06F 21/57 718/1 |

* cited by examiner

*Primary Examiner* — Sujay Koneru
(74) *Attorney, Agent, or Firm* — Law Office of R. Alan Burnett, P.S

(57) ABSTRACT

Methods, apparatus, software, and system architectures for supporting virtualized system migrations and scaling. Under aspects of a method, data is automatically collected and aggregated at multiple levels by a plurality of agents for each of multiple data centers. The data includes data relating to virtual machine utilization, data relating to electrical utilization costs, data relating to data center utilization, and data relating to triggers events. The data is processed to determine whether to migrate virtual servers from a first data center to a second data center. The software architecture includes a plurality of modules including a controller, data center profile, transition triggers, power cost profile, and virtual machine package module. The agents are implemented in an agent hierarchy and configured to collect data themselves and/or aggregate data from other agents and provide an API to facilitate access to collected data and agent services.

21 Claims, 10 Drawing Sheets

| Data Center Profile | Description |
|---|---|
| Max Capacity (Watts) | Max amount of Watts this DC can use |
| Current Capacity (Watts) | The current running Watt Capacity |
| Avg Watt Availability | Running Daily Avg of Watts Used |
| Number of Units Avail | A unit is a measurement of 1 proc with 1gb of memory. |
| Storage Cap Avail | Amount of storage availability |
| Power Cost Profile | See Power Cost Profile Desc |
| Renewable Energy Usage Percentage | Percent of power that is supplied via Renewable Energy |
| Data Center Location | GEO Location |

| Power Cost Profile | Description |
|---|---|
| Watt Hour Price below Utilization Threshold | Cost of power when running below allotted min threshold |
| Watt Hour Price above utilization Threshold | Cost of power when running above allotted max threshold |
| Current Cost per Watt Hour | Current running Watt Hour cost |
| Future Cost per Watt Hour | Future cost of Watt hour if running a schedule |
| Local Power Generation Levels | Local source of power such as wind turbine(s), solar panels, etc. on site or operated by Data Center |
| Available Renewable Energy Level | Level of renewable energy that is available |
| On Site/Local Energy Storage | Energy Storage that is available on site or locally |

| Transition Triggers | Description |
|---|---|
| Power Cost per Watt | Trigger to move systems when power costs exceed this value |
| Utilization Threshold High | Trigger to move on high threshold hit |
| Utilization Threshold Low | Trigger to move on low threshold hit |
| Future Cost from Power Cost Profile | Difference of future cost, does it increase? If so, consider VM migration. |
| Environmental Transition | Weather, Natural Disaster or any other issue that creates an unsafe operating environment |
| New VM Creation | Event that causes a new VM to be created |
| Custom Trigger Event | Any admin based policy to force an event |

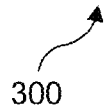
300

*Fig. 3*

| VM Package | Description |
|---|---|
| VM System Proc Requirements | How Many CPU's does this system need |
| VM Storage Data Size | Storage requirement |
| VM System Memory Requirements | Memory requirement |
| DC Units Required | 1 proc / 1 Gb of mem equals 1 unit |
| Average CPU Usage | Avg CPU load for this VM |
| VM Operating Priority (1 - 3) | Operation Priority. Range from 1 is critical to 3 is Non-critical |

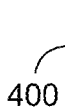
400

*Fig. 4*

LIVE MIGRATION OF VIRTUALIZED SYSTEMS

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services that employ private network infrastructure.

Cloud-based services are typically facilitated by a large number of interconnected high-speed servers, with host facilities commonly referred to as server "farms" or data centers. These server farms and data centers typically comprise a large-to-massive array of rack and/or blade servers housed in specially-designed facilities. Many of the larger cloud-based services are hosted via multiple data centers that are distributed across a geographical area, or even globally. For example, Microsoft Azure has multiple very large data centers in each of the United States, Europe, and Asia. Amazon employs co-located and separate data centers for hosting its EC2 and AWS services, including over a dozen AWS data centers in the US alone. Typically, data is replicated across geographically disperse data centers to ensure full service availability in case all or a portion of a data center goes down in view of power failure/availability events (e.g., blackouts and brownouts), weather events and other natural disasters, network availability issues (e.g., cutting or otherwise unavailability of high-capacity optical cables), and for other reasons.

Of significant importance are power consumption and cooling considerations. Faster processors generally consume more power, and when such processors are closely packed in high-density server deployments, overall performance is often limited due to cooling requirements. Not only due the processors and other components in the servers consume an incredible amount of power, significant additional power levels are consumed for cooling purposes. As a result, one of the largest operating costs for data centers is power. While much improvement has been made in the form of lower power-consuming silicon, better cooling management, and smart power supplies, hardware vendors are quickly hitting a wall for reducing energy costs. For this reason, many data centers are located in areas with low electrical rates. A prime example is Quincy, Wash., which is located close to several large dams and has one of the lowest electrical rates in the world. Several very large data centers are located in Quincy, including data centers for Microsoft (ninth largest in the world), Yahoo, Dell, Intuit, Sabey, and Vantage.

While electric utility rates are drivers for determining the location of some data centers, the location of a data center may be dependent on a multitude of additional factors, as well. For example, such factors may include location to population centers, availability of data transfer bandwidth and rates, energy supply reliability, tax considerations such as property and sales tax rebates and/or abatement, building costs, weather considerations, environmental considerations, and others.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a table illustrating an exemplary set of parameters used to generate a data center profile;

FIG. 2 is a table illustrating an exemplary set of parameters used to generate a power cost profile;

FIG. 3 is a table illustrating an exemplary list of transition trigger conditions and events;

FIG. 4 is a table illustrating an exemplary set of parameters used to generate a virtual machine package;

DETAILED DESCRIPTION

Figure 5:
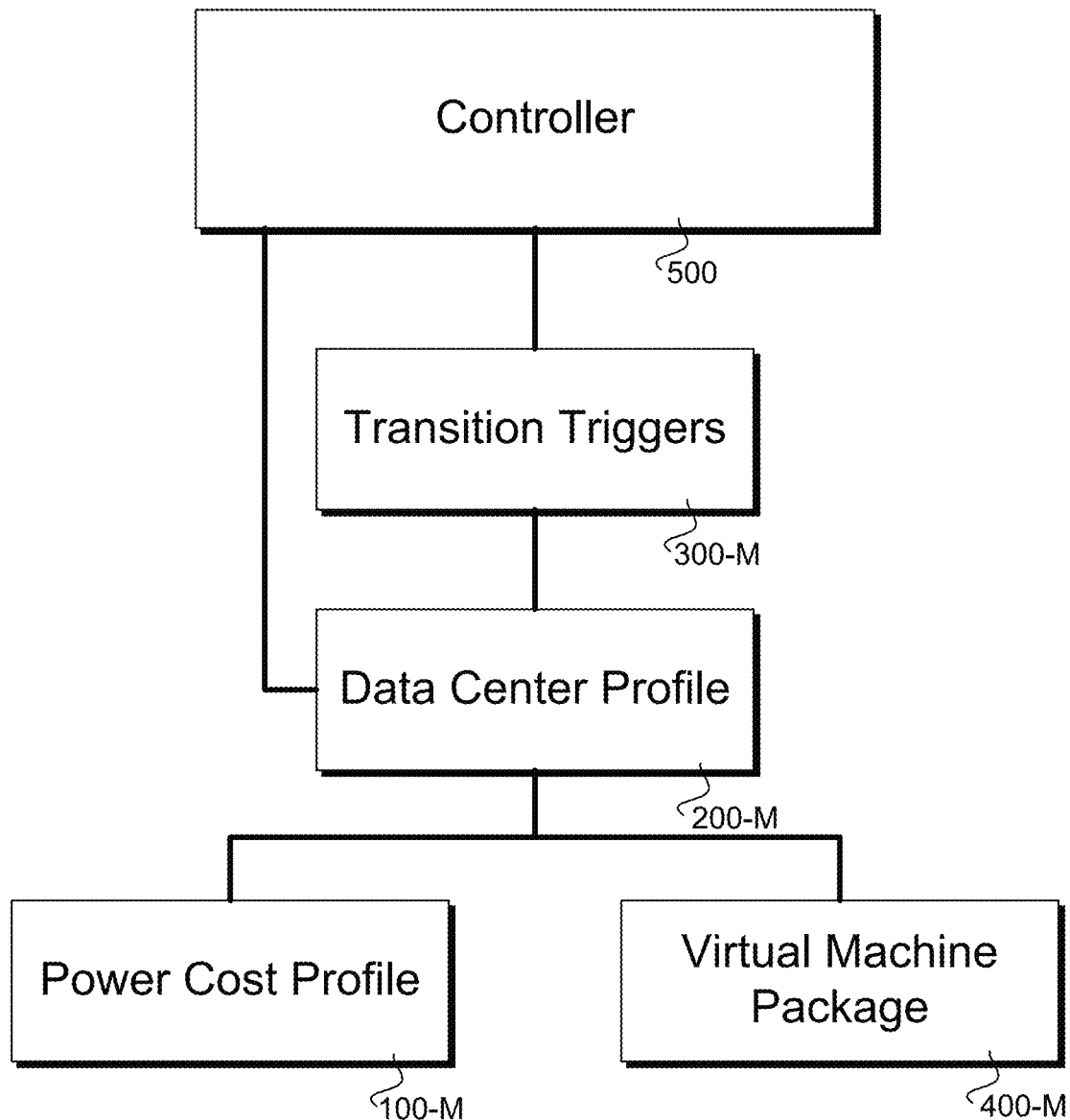
FIG. 5 is a block diagram illustrating a high-level software architecture for facilitating migration and scaling of virtualized systems, according to one embodiment.

Embodiments of methods and apparatus for facilitating live migration and dynamic scaling of virtualized systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Many of today's rack and blade server architectures employ multiple multi-core processors and/or employ "micro" servers. These architectures provide higher performance densities, along with other benefits, such as built-in redundancy and scalability. Additional scalability is obtained through the use of virtual machines, which enables a single physical server to operate as multiple virtual servers. Since server farm and data center workloads may be highly variable, it is often advantageous to only keep as many servers active as necessary, thereby reducing power consumption. However, it is not as easy as simply turning servers on and off on demand. One way to reduce power consumption when using servers employing multiple processors is to put one or more of the processors into a very-low power idle state. Under typical virtual machine and/or operating system considerations, putting a processor in a multi-processor server into an idle state requires coordination between the processors so that applications running on the servers remain operational.

The use of geographically-disperse data centers in combination with use of virtualized environments provides additional flexibility to the data center operators. From the perspective of a consumer using a cloud-hosted service, whether a data server is located 100 miles away, 500 miles away, or even several thousand miles away makes little difference. At the same time, there are a number of parameters that may affect the cost and performance associated with hosting cloud-based services from a given data center, including power costs (fixed rates, load-based rates, hourly, etc.), available power capacity, server capacity, storage capacity and location, geographical location, network costs, etc.

Many Data Centers now operate using virtualized environments under which physical servers are configured to host multiple virtual machines, each operating as a virtual server instance. The use of virtual servers not only enhances scalability, it typically reduces costs on a per-server basis when compared to non-virtualized environments. Virtualized environments also provide greater flexibility than comparable physical server implementations, enabling not only the ability to quickly scale up or scale down services in a given data center, but allowing an administrator to easily move virtual systems between data centers. As used herein, moving a virtual server instance from one data center to another data center is termed server "migration." Under current approaches, data center administrators generally manually initiate (trigger) server migrations in consideration of one or more parameters that are observed by the administrator, or through a predetermined schedule. This approach is rather inefficient and labor intensive.

In accordance with embodiments of the invention disclosed herein, techniques are provided for automating migration and scaling of virtualized environments based on many different factors and/or triggers. In one aspect, a "Controller" in combination with an Agent and Application Program Interface (API) architecture is implemented that gathers inputs relating to various operation parameters and trigger conditions and initiates server migrations between data centers in response to detection of application conditions and/or triggers. Moreover, the Controller/Agent/API architecture is structured to support different levels of granularity in the migration determinations, and distribute data gathering and decision making workload across multiple levels of data center hierarchy.

FIG. 1 shows a table 100 corresponding to a DC profile containing an exemplary list of parameters used for determining conditions under which virtual server migrations may be triggered, according to one embodiment. The maximum capacity represents the maximum level of energy the data center can use and/or is available from one or more utilities. This generally may be a fixed value, or may be variable in consideration of dynamic energy grid load conditions. For example, during summer months, energy grids supporting larger populations may experience higher levels of consumption and/or may have reduced capacity. In view of such circumstances, the maximum energy made available to a data center may be throttled.

The current capacity represents the current energy consumption level, measured in Watts or multiples thereof (e.g., measured in Kilowatts or Megawatts). The average Watt availability represents the average Wattage level that is consumed by the data center.

The number of available units refers to the number of available physical server instances and/or the number of virtual server host unit instances. For example, a unit may include a processor in combination with a selected amount of memory. A typical physical server may include a processor with multiple cores and an amount of system memory. It is common for each core (or logical core) to host a separate virtual server instance, with the server's total system memory allocated between the virtual server instances hosted by the physical server (with some system memory reserved for the server's operating system and virtual machine manager (VMM) or hypervisor). For example, a quad-core processor employ Intel's Hyperthreading™ architecture has eight logical cores and thus might be configured to host eight virtual server instances. If the server has 16 Gb of memory, each virtual server could be allocated 1.8 Gb, with the 1.6 Gb of remaining memory reserved for the operating system and VMM/hypervisor. It is noted that an even distribution of memory is merely exemplary, as some virtual machines may be allocated more memory and/or processor resources than others running on the same physical host.

The storage capacity available represents the amount of storage available for usage by the data center servers. Depending on the particular implementation, this may be limited to local storage capacity, that is storage facilities that are within or proximate to the data center, and/or the capacity for a combination of local and remote storage facilities.

The power cost profile generally is determined as a function of multiple parameters, and is discussed in further detail with reference to power cost profile table 200 in FIG. 2. The renewable energy usage percentage is the percent of power consumed by the data center that is supplied via one or more renewable energy sources. For example, energy provided by hydroelectric power, wind farms, solar sources, and geothermal power may be considered renewable energy sources. Depending on the applicable regulations/definitions, energy sources such as biomass may also fall under a renewable energy source category. Generally, there may be local, state, and/or federal financial incentives to employ renewable energy sources over fossil-fuel resources, such as through burning coal or natural gas. If CO2 levels are a consideration, sources such as nuclear power may also be weighed.

Data center location corresponds to the geographical location of the data center. This parameter may be calculated through a combination of other parameters relating to geographical location, such as civil unrest, weather, disasters, power stability, data security, user experience, and other factors discussed above. Furthermore, by contractual agreement or legal requirement, some software may be restricted from running in certain countries or regions. The geographical parameter would ensure these requirements are fulfilled.

FIG. 2 shows a power cost table 200 illustrating an exemplary list of parameters that may be employed for calculating the power cost profile parameter used in DC profile table 100. In recent years, electric utilities have gone from a (generally) fixed price model to a dynamic pricing model. Typically, electrical energy costs are based on a per Kilowatt-hour rate. Under a dynamic pricing model, this rate may vary depending on a multitude of factors. For example, under deregulated energy markets in many parts of the United States, various energy suppliers input supply bid curves to the Independent Service Operator (ISO) for the market, which results in a market price that is calculated on a periodic basis, such as hourly or quarter-hourly. In addition to the input bids, there are transmission costs that are determined using a transmission congestion model; since each segment of a transmission route has a fixed capacity, when multiple generating units attached to different points in the grid are employed, transmission routes also need to be determined so that none of the transmission segments becomes overloaded. The net result is that the cost for a utility to purchase energy may vary under different conditions.

While a utility's cost of purchasing energy may vary throughout the day, utilities typically charge their customers using less granularity. For example, an individual homeowner may be charged at different rates based on energy consumed for a given billing period, or optionally may opt for time-based billing under which different predetermined rates are charged during different time period. Since data centers consume very large amounts of energy, they often have special contracts with the utilities that supply them with electricity. Under some contracts, there may be different rates charged for different utilization thresholds. For example, in order to receive a favorable rate, a data center may need to utilize some minimum threshold of energy; if this is not met, a higher energy rate is billed. There also may be a maximum threshold at which the cost of energy increased. The first two parameters in power cost profile table 200 correspond to these minimum and maximum utilization thresholds.

The current and future cost per kilowatt hour correspond to a current energy cost and future energy cost as relates to a variable energy cost schedule. The energy cost schedule might be based on a predefined rate schedule, or it may be determined on the basis of historical rates for data centers that are located in deregulated energy markets. For example, it may be advantageous to migrate servers between data centers in different time zones depending on what rate is being charged for which data center for a given time of day. Since most non-data center energy consumption generally follows a business operation schedule (e.g., generally higher energy usage occurs during business hours, such as 8 AM-6 PM for a given time zone), some utilities may charge a higher rate during these hours. During the summer, this is exacerbated by additional electrical energy consumed for cooling purposes, since it is hotter during business hours than during evenings and nights. For a given time zone it may be advantageous to migrating servers away from data centers in that time zone during a portion of the day during which higher rates are billed.

The Local Power Generation Levels correspond to on site or local power sources operated by the data center, such as but not limited to wind turbines, solar panels, gas turbines, diesel generators, etc. While power derived from on site or local wind turbines and solar panels is very low, data centers generally have gas turbine generators and/or diesel generators for backup conditions in case power is not available via the grid. In some instances, use of a local gas turbine generator may be more cost effective than purchasing power from the grid during peak rate periods.

The Available Renewable Energy Level corresponds to the level of renewable energy that is available. As discussed above, the may be favorable rate reductions and/or rebates if certain usage levels of renewable energy levels are met, generally depending on the location of the data center (e.g., some states will offer better deals than others for using renewable energy sources). In addition, the Federal government may offer rebates, tax incentives, or other incentives to use renewable energy sources.

On Site/Local Energy Storage corresponds to energy storage that is available on site or proximate to a site. For example, various techniques are currently being developed for storing energy that may be used at a later point in time. Currently, the most common technique for storing electricity employs battery-based units, but in areas such as Washington and Oregon, large quantities of water may be stored in elevated reservoirs, wherein excess electricity during low demand periods may be used to pump water up to the reservoirs. Water from the reservoirs may be released later and passed through turbine generators to generate electricity.

In accordance with some embodiments, a centralized controller is implemented as part of is an automated system that triggers server migrations between data centers. At a top level, the controller has two base job functions: decision maker and data gatherer. The controller first acts a decision maker to determine when VM migrations should occur and where new VMs should be located. These decisions are made utilizing data from the second function of the controller, which acts as a data gatherer. The controller sits at the top of a data gathering hierarchy, aggregating data gathers from various agents or the like at lower levels in the hierarchy, as explained in further detail below.

As a decision maker, the controller utilizes Transition Triggers to determine when a new DC should be identified for the operating a VM, or VMs. A Transition Trigger table 300 illustrating a list of exemplary trigger conditions is shown in FIG. 3. At the top of the list is a power cost per Watt trigger. This moves VMs when a power cost exceed this value. A similar cost-based trigger may be implemented that considers a difference in power cost rates between two data centers—if the difference exceeds a threshold, a VM server migration may be triggered.

As discussed above, utilities may charge different rates if a data center utilization is too low or too high. Corresponding conditions shown in table 300 include a utilization high and utilization low threshold. A migration trigger may also result from a calculated change in future cost (relative to a current cost) using parameters employed by the power cost profile discussed above.

A VM server migration may also result for an environmental event, such as a weather event, natural disaster, or any other issue that creates an unsafe operating environment. For example, it is common for extreme weather conditions to cause disruptions in power distribution capabilities, such as resulting from downed power lines or other failures in the power distribution system.

Creation of a new VM creates another type of trigger. In response to determination of the need for a new VM server, a determination is made to which data center the VM is to be added. Generally, VM's indirectly consume power, while the physical servers on which the VMs are running directly consume power. For example, adding a new VM to a physical server that is already operating in an up power state will typically result in a smaller change in energy consumption than having to bring up an additional physical server to host the new VM. As is well-known, physical servers and/or VM's may be operating in a low-power or idle state, and be switched to a full-up state to support rapid scaling of data services hosts by the data center. Under either of these circumstances, creating a new VM may actually correspond to changing the power state of an existing VM and/or its host physical server from the low-power or idle state to a full operational state.

In addition to the foregoing triggers, custom triggers may be also be implemented. For example, an administrator may define triggers to force a corresponding trigger event.

VM server migrations may also be triggered as a function of multiple conditions and parameters. For example, a weighted algorithm may be employed that considers multiple weighted inputs to determine when a migration may be triggered. Generally, a migration has additional "costs" associated with it outside of energy costs, including administrative costs, data transmission costs related to the server migration itself, reconfiguration costs, and data transmission costs related to services provided by the migrated server after it is migrated. For instance, while it may be advantageous from a energy cost standpoint to operate a global services using an off-peak hour scheme under which the data center location is migrated ahead of the time zone associated with the majority of service users, there may be addition costs incurred for network data transmission, particularly if this would entail use of intercontinental cables.

When one of the transition triggers are met, the controller utilizes its global knowledge of all the DC's it controls and evaluates the DC Profile to make a decision as to where the VM should be either created or migrated to. To properly make this decision, the controller utilizes the VM Package Profile that contains all of the required operating data on the VM being moved or created. An exemplary list of VM Package Profile parameters is illustrated in table 400 of FIG. 4.

The VM System Proc(essor) Requirements identifies how many CPUs the system needs. The VM Storage Data Size defines the storage requirements. The VM System Memory Requirements defines the memory requirements, while the DC Unit Required defines the number of Data Center units that are required, wherein in one embodiment one unit corresponds to a single processor with 1 Gigabyte of memory. In another embodiment, a DC unit comprises a processor core with an associated amount of memory (e.g., 1 Gb, 2 Gb, etc.) The Average CPU Usage corresponds to the average CPU load for the VM. The VM Operating Priority in the illustrated embodiment has a range from 1-3, wherein 1 is critical and 3 is non-critical.

FIG. 5 shows a high-level interface and data aggregation architecture employed for effecting virtual server migrations, according to one embodiment. The architecture employs a controller 500 that is configured to collect data from various sources and initiate virtual server migrations in response to trigger events defined in transition triggers table 300 and implemented via a transition trigger module 300-M. The transition triggers are generated based on aggregations of various data including parameters in the power cost profile table 100 through use of a power cost profile module 100-M, the virtual machine packet table 400 through use of a virtual machine packet module 400-M, and the data center profile table 200 through use of a data center profile module 200-M.

Figure 6:
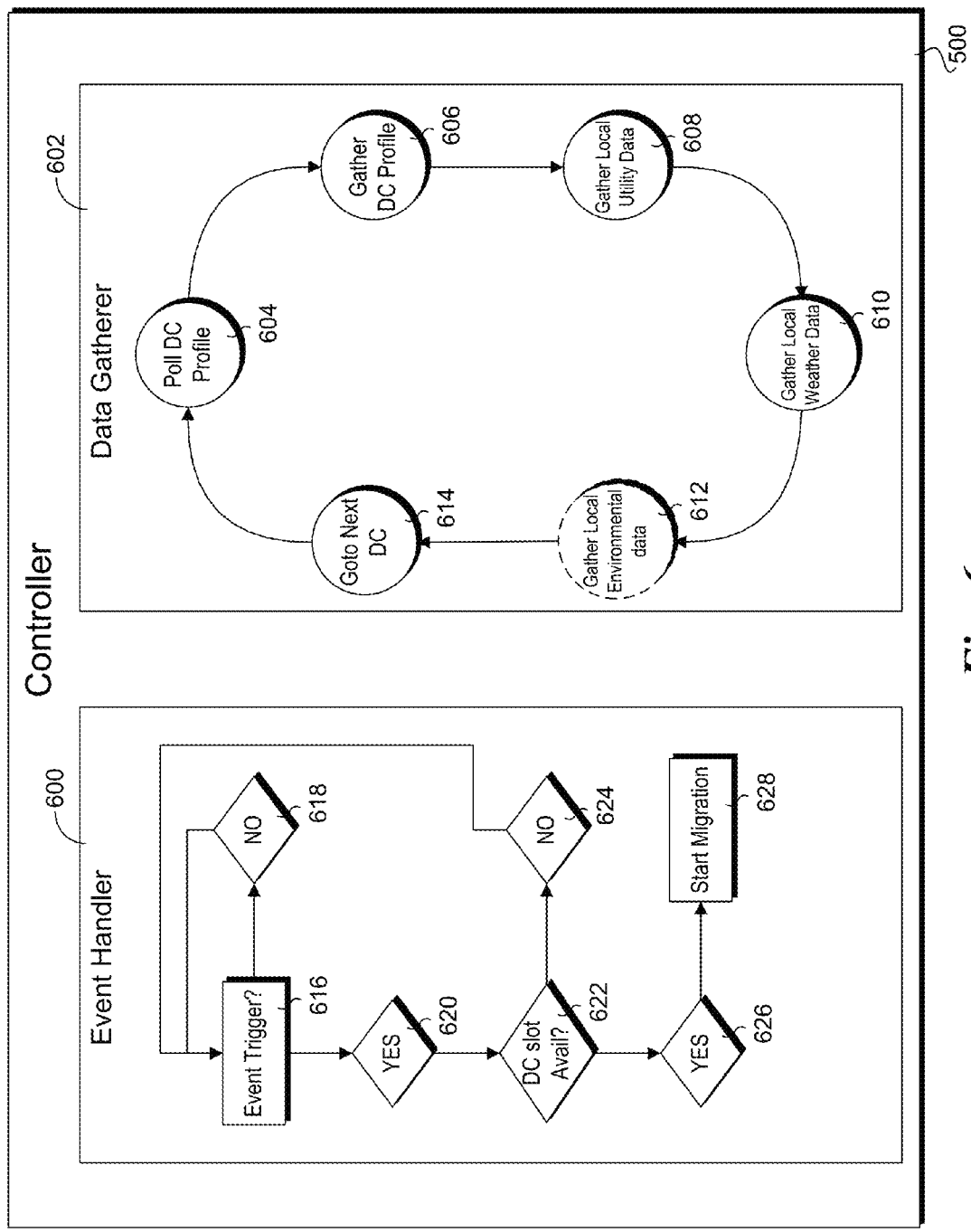
FIG. 6 is a combination block schematic, flowchart, and state machine diagram illustrating various operations and logic performed by a controller, according to one embodiment.

FIG. 6 shows further details of selected aspects of controller 500, according to one embodiment. The controller has two primary functions—as an event handler 600 and a data gatherer 602. Events are handled in response to data gathered by data gather 602. Data gathering is performed during an ongoing basis, using a polling model (as illustrated in FIG. 6), a push model, or a combination of the two. Under the illustrated polling model, a polling cycle is performed on a (generally) periodic basis, such as at predetermined time intervals or according to a schedule. The polling cycle starts at a state 604, which corresponds to polling a data center for its DC profile data. The DC profile data is gathered, as depicted by a state 606. Additional local data (i.e., local to the data center) is also gathered by data gatherer 602, including local utility data during a state 608, local weather data during a state 610, and local environmental data during an optional state 612. Examples of local environmental data include anything in a region that could impact data center operations, such as an earthquake, a fire, a war, a Tsunami, etc. As depicted at a state 614, the cycle is repeated for each data center for which virtual server migration is managed by controller 500.

The event handler 600 function includes logic for detecting event triggers. Generally, an event trigger may be determined through evaluation of data gathered by data gatherer 602, or may be in response to a specific trigger that is generated by a data center migration agent or the like, as described in further detail below. Under the polling model, event triggers may be evaluated on a periodic basis corresponding to the polling rate or schedule. The evaluation of a trigger event is depicted in a block 616, with the determination to the existence of a trigger event depicted in decision blocks 618 (NO) and 620 (YES). In response to a trigger event, the event handler logic proceeds to a decision block 622 to determine whether there is a data center slot available to perform a virtual server migration corresponding to the trigger event. Depending on the type of trigger and migration granularity settings, a migration may involve as little as a single server, or the minimum migration size might correspond to an aggregated level of servers, such as a minimum migration corresponds to a single physical server or a blade server chassis worth of physical servers. As depicted by a decision block 624 indicating NO data center slots are available, the logic continues to evaluate the availability of the data center slots until a YES decision results, as depicted by a decision block 628. In response to a YES result, virtual server migration is started in a block 628.

Figure 7:
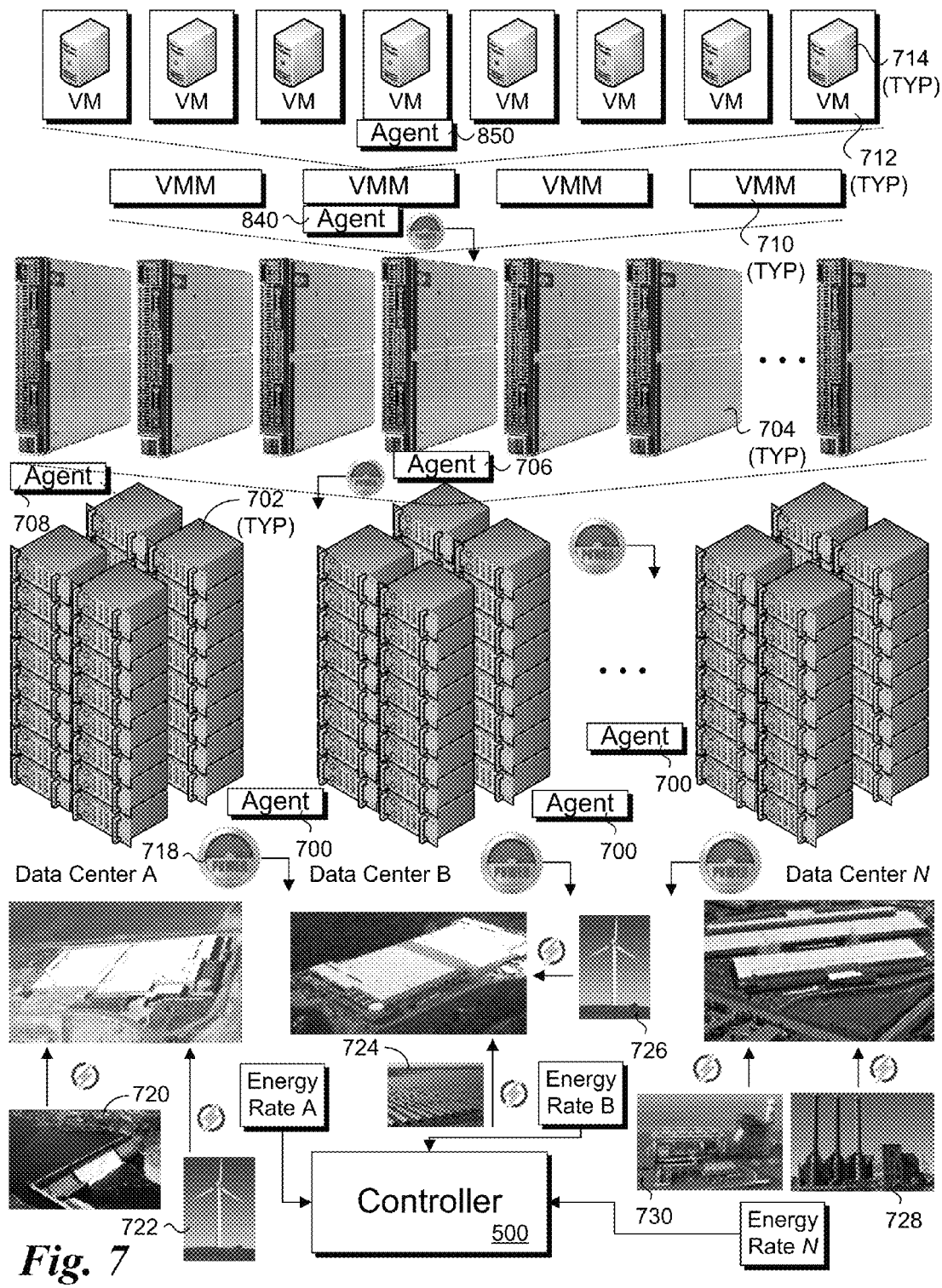
FIG. 7 is a diagram illustrating a distributed software implementation for facilitating migration and scaling of virtualized systems, according to one embodiment.

FIG. 7 illustrates the use of different levels of data aggregation that may be used as inputs to controller 500 and that is facilitated by various agents operating at the different aggregation levels. The highest level of aggregation occurs at the data center level, which generally includes data gathered by data gatherer 602, as depicted in FIG. 6. In one embodiment, there are one or more data center agents 700 at each of multiple data centers, as depicted by data centers A, B, . . . and N. Each data center includes a large number of physical servers that are typically configured in rows of blade server racks, wherein each blade server rack includes multiple blade server chassis 702, and each blade server chassis includes multiple server blades 704. In some embodiments, data is aggregated at one or more of the server blade level, the blade server chassis level and/or the blade server rack level, wherein applicable data is gathered by an agent associated with that level, as depicted by a server blade agent 706 and a blade server chassis agent 708. In some embodiments, a management blade or the like is implemented for each blade server chassis, or for a group of blade server chassis. Generally, the management blade may comprise a server blade that is similar to other server blades but additionally includes management software, or may comprise a special-purpose server blade. Within a given data center, other levels of aggregation may exist, such as through use of an agent that aggregates data across a block or servers and/or aggregations at a server room level (both not shown). For example, a given data center may have multiple server rooms or otherwise larger partitioned groups of server racks.

In addition to these levels of aggregation, there may be additional levels of aggregation corresponding to the VMM's and VM's running on server blades 704. For example, each server blade 704 will generally be configured to host one or more VMMs 710. Each VMM 710, in turn, will generally be configured to host multiple VMs 712 that are configured to operate as virtual servers 714. In some embodiments, a server blade 704 may include multiple "sockets," with each socket configured to interface to a processor, such as a multi-core server processor implemented as a System on a Chip (SoC). In turn, each multi-core server processor may be employed for running a host operating system on which a VMM or Hypervisor is run, which is used to host one or more VMs. As detailed below with reference to FIG. 8, agents may be employed at the VMM and, optionally, VM level to provide additional data that may be aggregated up the chain and provided as data inputs to controller 500.

Agents at lower levels of aggregation are configured to generate applicable data, such as virtual machine package data, which is aggregated by agents at higher levels to produce other aggregations of data, such as data center profile data. Agents at the highest aggregation level, such as data center agents, communicate aggregated data to controller 500.

In addition to the aggregated data, controller 500 gathers other data using a polling, push, or combination model. For instance, such information may include real-time and/or averaged data center power measurements 718. Generally, the power utility that provides electrical power to a data center will employ multiple power meters for measuring the power consumed by the data center, such as a power meter for each high-amperage power input. Today, many of these meters are digital and may be configured to provide real-time power measurements. Depending on the implementation, the real time power measurement data may be gathered by the utility, with corresponding data available via a private Web portal or other secure on-line facility and/or the data center itself will have a real-time power measurement equipment and monitoring software. Under either approach, controller 500 will be configured to gather real-time energy consumption data. In addition, controller 500 will be configured to gather and/or lookup energy rate data for the electrical utility that provides power to each data center.

Figure 9:
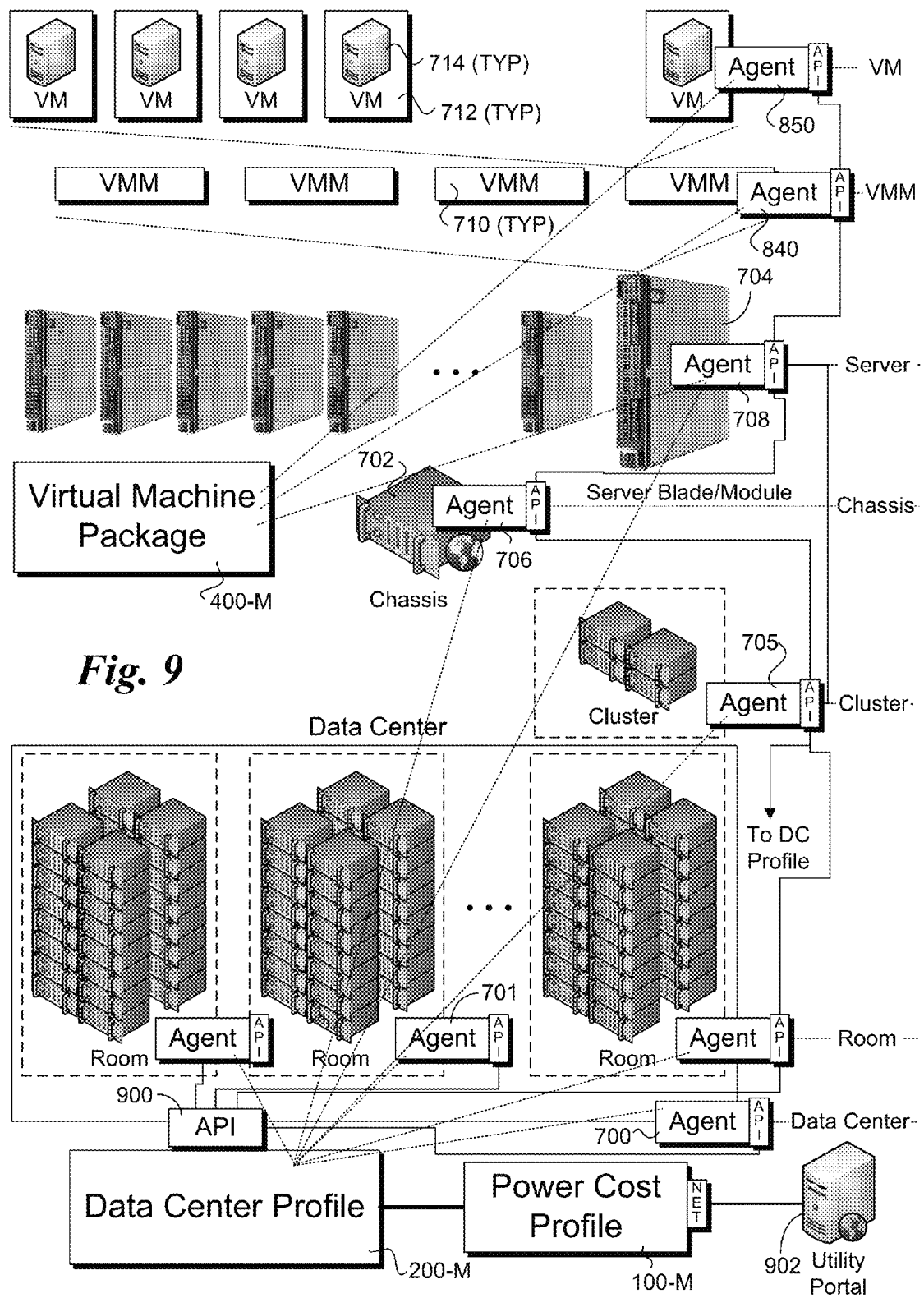
FIG. 9 is a block schematic diagram illustrating implementation of a distributed agent hierarchy that is used to implement operations associated with a data center profile module and a virtual machine package module, according to one embodiment.

With further reference to FIG. 9, data center A is located in central Washington (Quincy), data center B is located in Texas, and data center N is located in Virginia. Data center A is located proximate to a number of dams, including Grand Coulee Dam 720, Chief Joseph Dam, Wells Dam, Rocky Reach Dam, Rock Island Dam, Wanapum Dam, and Priest Rapids Dam, all of which are on the Columbia River. In addition, a large wind farm 722 is located approximately 15 miles from Quincy. While the energy of the wind farm 722 is variable, the Columbia River dams provide a surplus of energy that is typically sold to other Western states, such as California. The primary electric utility is the Bonneville Power Association, which negotiates very low generally fixed electrical rates with the data centers in Quincy. Due to the contract structures, the changes in rate for being under the minimum threshold or above the maximum threshold are minor. For practical purposes, the rates for the data centers are fixed. Interestingly, to encourage development of additional renewable energy sources, hydroelectric power is not categorized as a renewable energy source in Washington state. As a result, the consideration of renewable energy usage is very minor, if at all. While the BPA may supply power to deregulated markets in the Western part of the United States, the rates that are charged to the data centers are independent of temporal market rates.

Data center B is located in a region of Texas that is covered by Texas' deregulated energy market, which is managed by the Energy Reliability Council of Texas (ERCOT), which also is the Independent System Operator (ISO) for the region. Under the ERCOT market, generation participants (the energy suppliers) input supply bid price curves, while consuming participants (the energy buyers) input energy purchase bid curves. There are generally two markets—the day ahead market, and the real-time market. A market participant may be a supplier, a consumer, or both. Based on participant inputs, a market price is derived for each settlement period. Generally, ERCOT does not produce a single market price for each settlement period, but rather prices may be regional and/or may reflect other consideration, such as grid congestion. To ensure reliability, bids for supplying ancillary services are also input—the services will normally not be used, but the bidders to provide such services are required to operate equipment in a state that can be brought online rapidly in view of failures within the system.

Generation supplies to ERCOT include generation via burning conventional fossil fuel sources, such as natural gas, as well as some hybrid plants that burn fossil fuels and biomass. In addition, other generation is provided by renewable energy sources, such as solar farms 724 and wind farms 726. As the sun and wind may vary, these generation sources are less predictable than using natural gas generation, wherein the output for a natural gas generation plant may be quickly ramped up or down over a fairly wide range without adversely affecting efficiency.

The net result of the foregoing factors is that the cost of energy (i.e., energy rate B) supplied to data center B is not fixed, but rather may vary throughout the day, depending on the market price for each settlement period and/or other contractual arrangements. Since a data center consumes such a large amount of energy, the data centers themselves could conceivably be market participants, although the data centers will typically contract through one or more utilities to supply power to them. Due to the price fluctuation, the rate penalties for consuming below the minimum and above the maximum consumption levels may be fairly significant.

Data center N is located in Virginia, and is supplied by Dominion Virginia Power. Dominion Virginia Power purchases generation from multiple facilities, including coal-fueled power plants 728 and natural gas plants 730. In addition, Dominion Virginia Power purchases generation from various renewable sources, such as wind (both offshore and on shore), biomass. Due to the relatively high cost of coal-fueled power in combination with rate tariff preference for renewable generation sources, the cost of electrical energy in the Virginia data centers is generally higher than in Texas, and may be significantly higher than in Quincy. However, as illustrated by the AT&T IP backbone network diagram, there is significantly more data network infrastructure in the Northeast and than for the rest of the United States, resulting in generally lower network transfer cost from the Virginia data center than either the Texas data center or Quincy data center.

As discusses above, some implementations may collect data at the VMM level (or host operating system level) and, optionally, the VM level. It is common for modern operating systems to support a range of power management features, such as changing power states and generating power consumption data for a host processor. While it may be possible to query power consumption information from an operating system hosted by a VM, this information may be inaccurate since the operating system is not actually running on physical hardware. However, there may be information that the operating system can provide that will indicate how much of a core's processing capacity the VM is utilizing. Optionally, or in addition, such information may be aggregated by the host OS and/or VMM.

Figure 8:
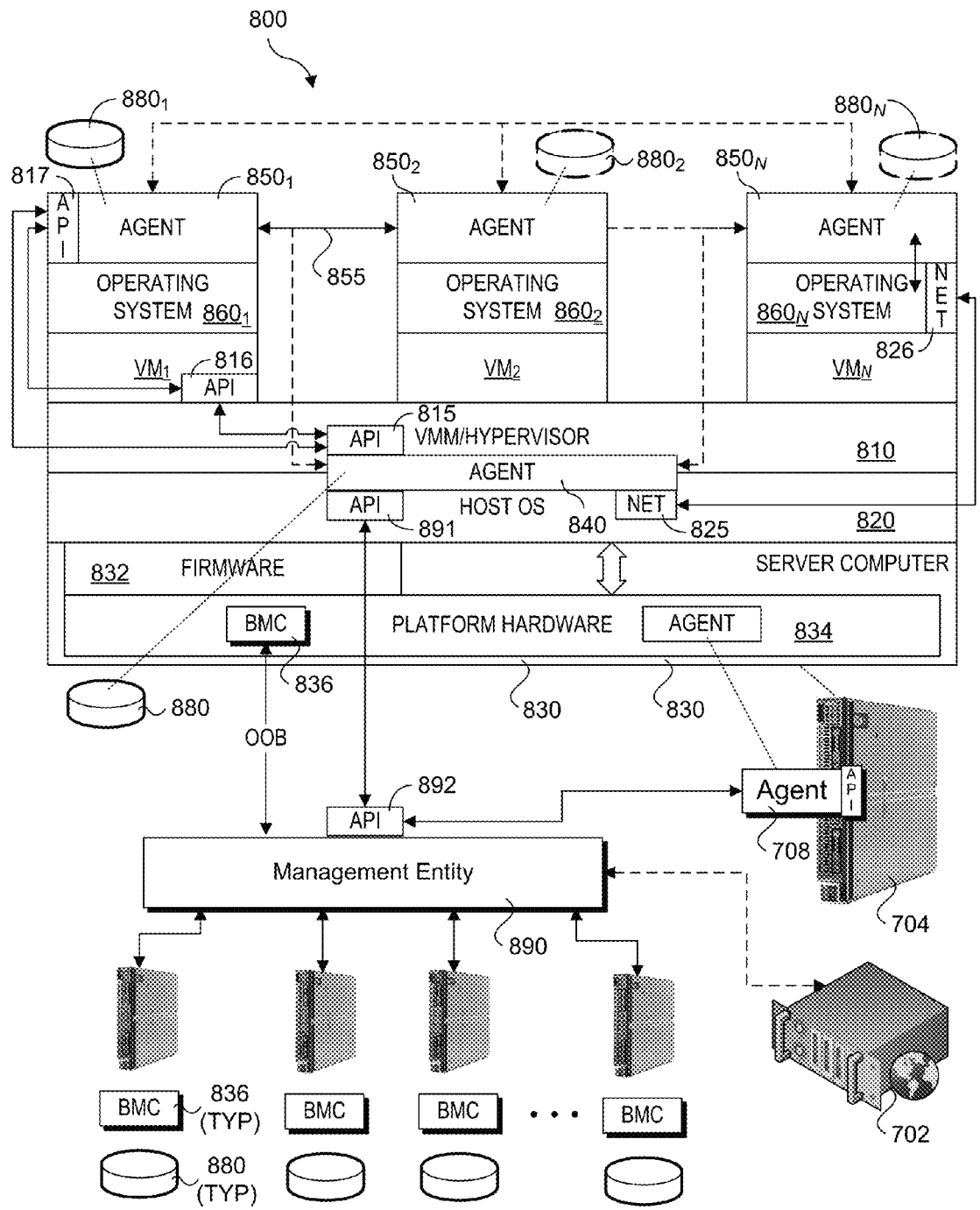
FIG. 8 is a schematic block diagram illustrating various software components used to effect VM, VMM, and server agents, according to one embodiment.

FIG. 8 shows an architecture 800 that is configured to support collection of power-related information by a VMM and multiple VMs through the use of software agents are enabled to communicate in a peer-to-peer manner and associated Application Program Interfaces (APIs). In further detail, architecture 800 includes a VMM (or Hypervisor) 810 that is used to host a plurality of virtual machines $VM_{1-N}$. The VMM 810 is hosted by a host OS 820 running on server computer 830. Generally, host OS 820 is enabled to access most platform hardware 834 through an interface provided by firmware 832. Meanwhile, depending on the configuration of server computer 830, some of platform hardware 834 may be directly accessed by host OS 820, such as through use of applicable OS device drivers.

In FIG. 8, a software agent $850_1$ running on an operating system $860_1$ of virtual machine $VM_1$ implements multiple communication mechanisms for communicating with other agents, such as an agent $850_2$ running on an operating system $860_2$ of a virtual machine $MV_2$, and a host OS agent 840. In one implementation, agent $850_1$ implements a peer-to-peer communication mechanism with agent $850_2$ running, as depicted by double-headed arrow 855. In another implementation, agent $850_1$ acts as the central collector for the performance information from other virtual machines and the host system.

In further detail, communication between agents may be facilitated in one of many ways known to those skilled in the software and communications art. For instance, host OS agent 840 may communicate with a virtual machine via respective APIs 815 and 816 provided by the host OS agent and the VM. In turn, an agent 850 may then communicate with the virtual machine API 816 via an API 817, as illustrated in FIG. 8. Under another embodiment, API 815 may communicate directly with API 817. Under yet another scheme, operating system-level communications are employed to enable communication between the host OS and a VM-hosted OS. For example, respective network OS components 825 and 826 (e.g., network stacks) may facilitate communications using a network protocol, such as TCP/IP or SOAP. In turn, the respective agents may communicate with their respective OS hosts via an API or the like or some other OS-to-application communication scheme.

As further shown in FIG. 8, in one embodiment various performance, configuration, and event data may be stored in a data store 880 accessed via host OS agent 840. Optionally, each of agents $850_{1-n}$ may manage and/or be provided access to a replicated instance of these data, as depicted by data stores $850_{1-n}$. In general, the VM-hosted agents may employ respective portions of system memory allocated to their respective VM and/or local or remote disk storage space allocated to their respective VM.

During operation of server computer 830, power usage and other performance data is collected by VMM 810 using agent 840, and optionally, collected at the VM level by agents $850_{1-n}$ through use of APIs 815, 816, and 817. The data for the server computer platform (e.g., a server blade) is aggregated and stored in data store 800. In some embodiments, this data is made available to a management blade or other management entity at the blade server chassis or rack level.

In addition to power and performance information collected by a VMM or host OS, a blade server architecture may be configured so support a management channel under which various performance information may be accessed by a management entity 890 such as a management blade or management server. The management channel may be an out-of-band (OOB) channel, or it may be a network-based channel that uses applicable protocols, such as SOAP (Simple Object Access Protocol), to collect data. Modern server processors and/or server baseboards have embedded management logic that is configured to facilitate access to various processor and core measures and expose the measures to an operating system and/or a baseboard management controller (BMC) 836 or the like. In addition to collection of data from the BMC, an agent in the management entity 890 may communicate with agent 840 via any suitable protocol such as SOAP and/or through use of an API, such as depicted by APIs 891 and 892.

In some server implementations employing multiple sockets, there may be multiple VMM instances hosted by the same physical server. Accordingly, agent 708 may be configured to provide server utilization information to management entity 890 via API 892 or a separate API (not shown), and, optionally, may be configured to aggregate information generated by multiple instances of agents 840. In connection with generation of server utilization information, agent 708 may interface with BMC 836 and/or acquire utilization information from OS power management components running on each of the multiple sockets.

FIG. 9 illustrates the implementation of distributed software components in combination with an agent hierarchy that are used to facilitate the operations of embodiments described herein. The agent hierarchy generally includes multiple agent levels, wherein agents at a given level aggregating data generated and/or gathered from agents at a layer or layers above them and providing aggregated data, which may include additional data generated by the agent itself, to an agent or agents at a layer or layers below that. The agents are arranged in a tree-like manner, wherein the number of agents generally increases as one proceeds higher up the hierarchy. With respect to FIG. 9, agent levels increase from lower to higher from the bottom of the page to the top of the page. In the illustrated embodiment in FIG. 9, the exemplary agent levels from lowest to highest include a data center level, a room level, a cluster level, a chassis level, a server level, a VMM level, and a VM level. Generally, the agent hierarchy may include more or less levels than shown in FIG. 9, and agents at other levels that are not shown may be implemented.

Agent 850, 840, and 708 respectively occupy the VM, VMM, and Server agent levels and operate in the manner described above with reference to FIG. 8. In one embodiment, these agents are implemented as components in virtual machine package module 400-M, and thus may be considered as virtual machine package module agents. Generally, these agents will collectively generate data corresponding to VM and physical server utilization on an individual server basis, with such data aggregated at the VMM or server agent level, noting the use of agents 708 at the server level are optional. For example, if a physical server hosts a single VMM, and agent at the VMM level (or host OS level) may be configured to generate VM utilization and server utilization data without requiring a separate agent at the server level.

Generally, agents 700, 701, 705 and 706, which respectively are implemented at the data center, DC room, cluster, and chassis agent levels, may be implemented as components that are associated with data center profile module 200-M. In addition, agent 708 at the server layer may also include functionality associated with data center profile module 200-M. As depicted, each of agents 700, 702, 705, and 706 include an API configured to support communication with other agents and/or an API 900 configured to support communication with data center profile module 200-M. Each of the APIs depicted in FIG. 9 may be configured to support a single API or multiple APIs.

Agent 706 operates at the chassis level, and in one embodiment comprises or is otherwise interfaced with management entity 890 of FIG. 8. Depending on the particular blade server or server module architecture, various server utilization data may be collected using a management blade or module or the like for each chassis. Agent 706 may also be configured to aggregate data from one or more of agents 708, 840, and 850. The API for agent 706 may be configured to communicate with the API of a cluster agent 705, a DC room agent 701 and/or API 900 (latter two not shown to avoid crowding).

Cluster agent 705 is configured to operate at a cluster level. As used herein, a cluster includes server blades and/or modules associated with multiple chassis, although it is noted that the virtual servers corresponding to a single chassis may be configured to support a cluster operation; in this case the chassis agent and cluster agent would be redundant, so operations relating to those discussed herein for a cluster agent would be implemented by a chassis agent. On one level, a cluster may be considered a group of servers that are managed collectively. In some embodiments, a cluster may be configured to support one or more services hosted by the data center, such that rather than migrating virtual servers that support part of a service, an entire group of servers that fully support the server are migrated, with the result that virtual servers are migrated on a physical cluster level.

In further detail, software for facilitating a cloud-based service is typically implemented using an n-tier architecture that includes a front-end Web server tier, one or more application services tiers, and a backend tier used for data storage such as file storage, or more sophisticated data management, such as through use of databases or big-data storage schemes. Under a conventional approach using physical servers, servers in a given tier might associated with a separate rack or set of racks, such that an entire rack might be filled with physical servers supporting Web servers functionality, a separate set of racks might be employed to support application services servers, etc. Generally, data storage tiers were implicated using separate physical equipment, such as storage appliances, storage arrays, etc. With the introduction of big-data architectures, data may be stored in a more distributed manner, making use of local storage on the blades themselves a practical option. This, in combination with virtualization, enable the hosting of entire services to be migrated between data centers by migrating the virtual services and applicable data that is stored on the server blades themselves.

A room agent 701 corresponds to an aggregation level that is between a cluster level and a data center level, which corresponds to an entire data center. The term "room" here is not meant to be limited to a room of servers, but rather some logical and/or physical partition of servers for which data profile data is collected and aggregated. Examples in addition to a physical room include on a rack basis, on a row or aisle of racks basis, on a multiple row/aisle basis, etc.

As illustrated in FIG. 9, an aggregation of data center profile data for a given data center may be collected by a data center agent 700, or such data may be collected from agents at higher levels, such as room level agents, cluster level agents or server level agents. Optionally, a combination of collection approaches may be used, where some data may be collected at API 900 from agents other than data center agent 700, while other data is collected and aggregated by data center agent 700 and communicated to data center profile module 200-M via API 900.

FIG. 9 further illustrates the distributed nature of the software architectures corresponding to embodiments described herein. For example, as shown, virtual package module 400-M may include software components corresponding to a plurality of agents that are distributed across multiple physical servers, and may be implemented by operating systems running on those physical servers and/or operating systems running on virtual machines hosted by the physical servers. Similarly, data center profile module 200-M may include software components corresponding to a plurality of agents implemented at one or more of the server agent level, the chassis agent level, the cluster agent level, the room agent level, and the data center agent level. Furthermore, whether an agent is configured to run on a virtual machine or a physical server, the agent comprises a software component or set of components including a plurality of instructions that are configured to be executed on a computing machine.

Returning to FIG. 10, examples of two virtual server migrations are illustrated. During a first virtual server migration, four virtual servers 714 are migrated from data center N in Virginia to data center B in Texas in connection with a server migration initiated by controller 500. As discussed above, a server migration may result from various trigger events or through processing aggregated data and determine it is advantageous to perform a migration. The illustration of a migration of four servers is representative of a much larger number of virtual servers to be migrated, as a typical data center rack alone may host 100's or even 1000's of virtual servers. For instance, Hewlett-Packard recently introduce a line of modular Web servers (Moon Shot) that has 45 server modules per 4.3 U chassis; a rack full of these server modules could support up to 1000 physical servers alone.

A migration of a virtual server actually involves instantiating a new instance of a virtual server on the migrated to data center that is configure to perform the same service as a virtual server being migrated, which is shut down at the migrated from data center after the migration. Along with the instantiation of a new virtual server instance, there may need to be data that is transferred, as well. Depending on the particular physical server architecture and service(s) hosted by the migrated virtual server, there may be data stored on the physical server that is to be migrated (copied from that physical server to the physical server at the migrated-to data center, or there may need to be data migrated from a data storage pool or the like that corresponds to data that is stored on equipment that is separate from the physical server.

For example, there are various types of network storage appliances, storage arrays, etc. that are used to store large volumes of data related to cloud-based storage services. Under some cloud-based storage architectures, the storage facilities and the server facilities for accessing the storage facilities are co-located or located a short distance away. Some cloud-based service providers employ geographic data replication, wherein instances of the same data are replicated across data centers at different geographical locations. Under a common approach, received (for storage) data is written to two (or more) storage devices simultaneous as the data is uploaded. Periodically, a copy of this data is written to a separate storage facility at a data center that is at a different geographical location. Under some migrations, the location of the storage facilities employed by the migrated virtual server instances may be an important consideration.

As illustrated by a second virtual server migration between data center B and data center A in Quincy, Wash., data corresponding to multiple storage volumes 1000 is migrated along with migration of the virtual server instances. In addition to considerations relating to migration of data storage volumes, there may be associated costs relating to copying that data between data centers itself, as well as added costs relating to data transfers to service users post migration. For example, large data centers typically negotiate favorable data transmission rates with network backbone providers. Such rates may include some level of bandwidth allocation the supports an elevated Quality of Service (QoS)—if the data center operator exceeds the allocated bandwidth the operator may either incur additional costs or the excess bandwidth traffic may be throttled. In addition, moving a data storage location may result in longer transmission routes for accessing the data. For example, moving primary storage from the East to the West coast may result in additional data transmission costs for the operator if a large portion of the users are on the East coast. This is a significant motivation for having data centers located on the East coast, since the energy consumption costs may be substantially higher for East coast locations.

Figure 10:
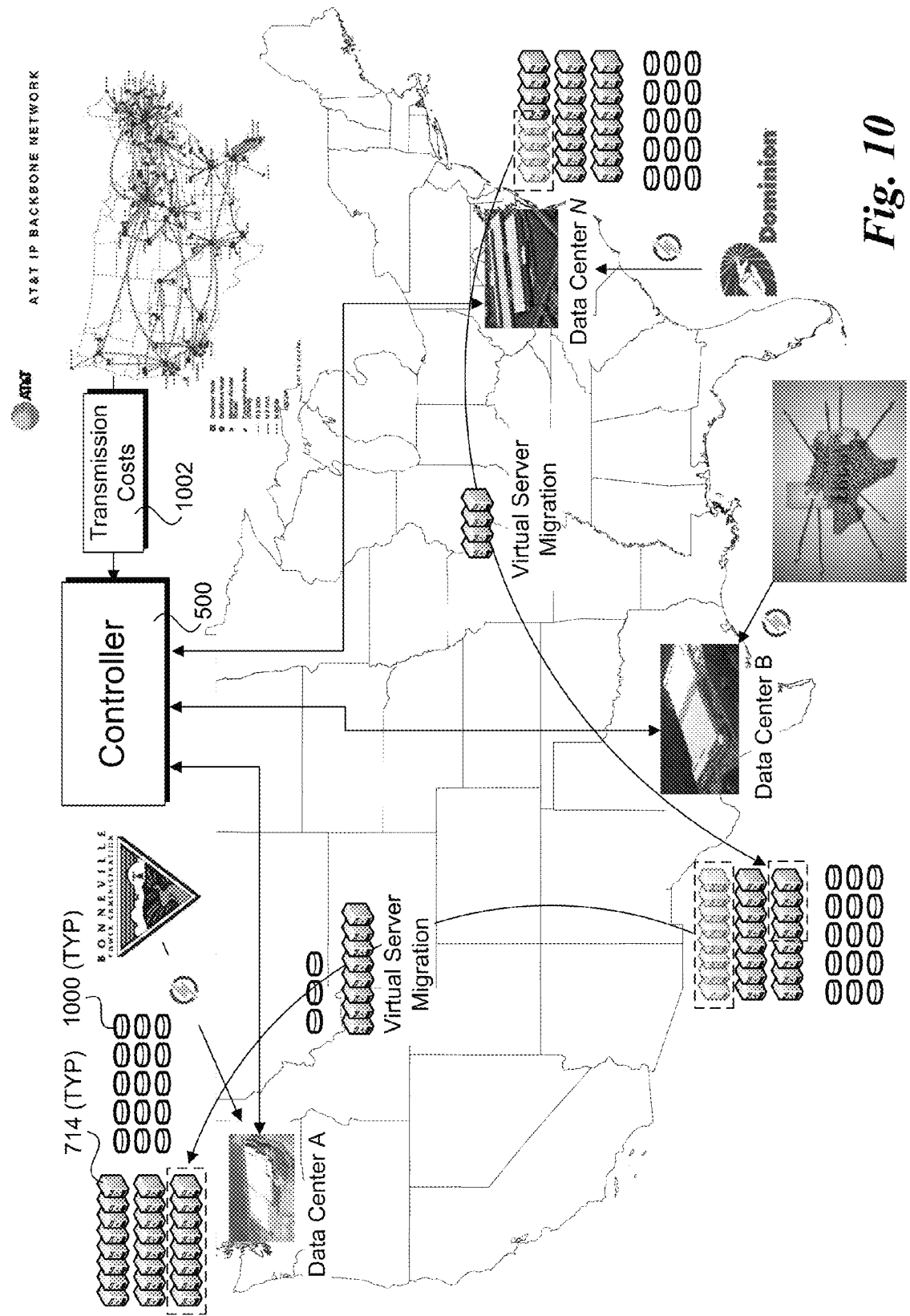
FIG. 10 is a schematic diagram illustrating two exemplary virtual server migrations.

The net takeaway from the foregoing is that there may be costs associated with server migrations relating to data transmission, and these additional costs may be modeled by controller 500 and considered when determining whether to initiate a virtual server migration. This input is depicted in FIG. 10 as transmission costs 1002.

Figure 11:
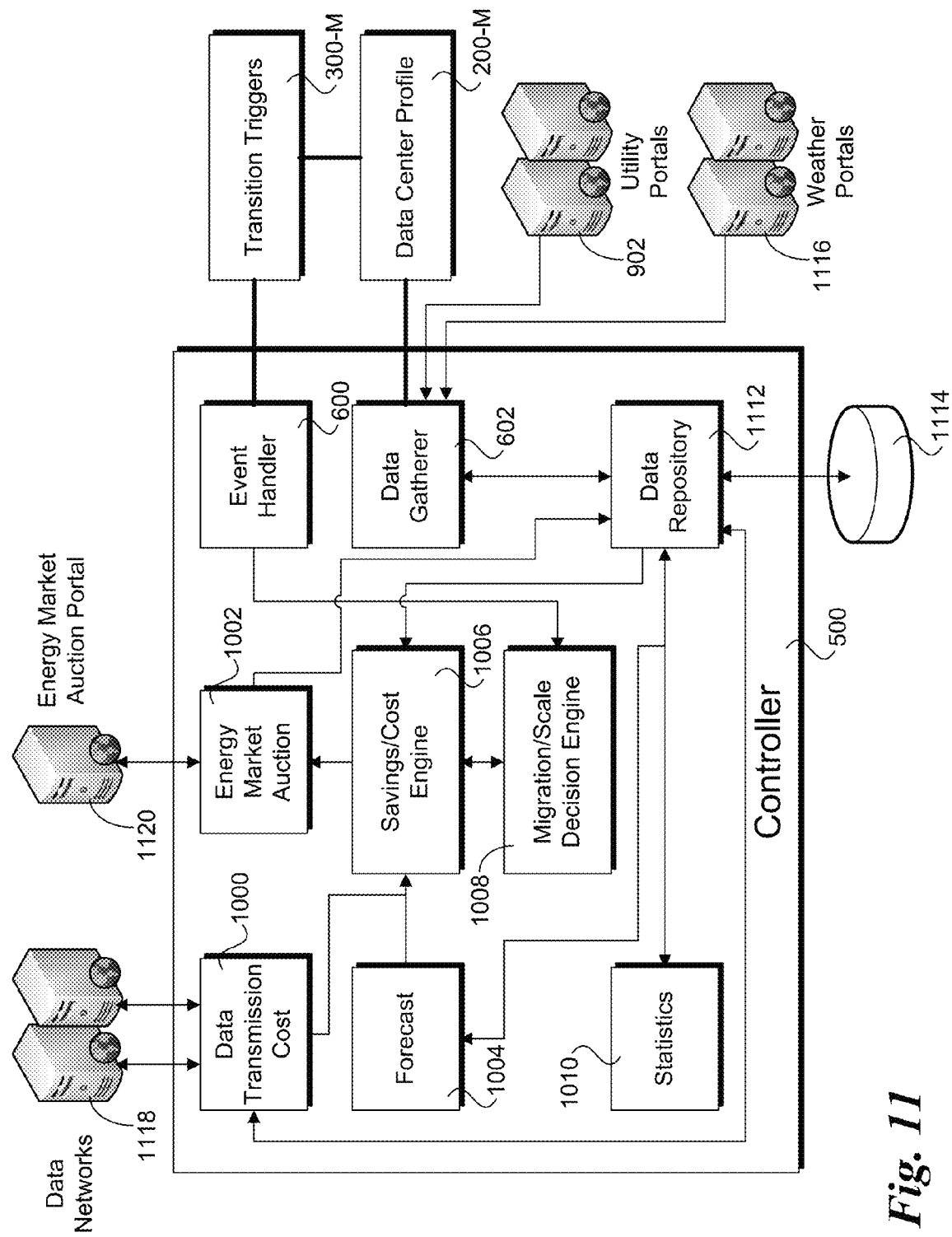
FIG. 11 is a block diagram illustrating various engines and software components used to implement aspects of the controller in accordance with embodiments disclosed herein.

FIG. 11 shows further details of controller 500, according to one embodiment. In addition to event handler 600 and data gatherer 602 discussed above, controller 500 includes a data transmission cost module 1000, an energy market auction module 1002, a forecast module 1004, a savings/cost engine 1006, a migration/scale decision engine 1008, a statistics module 1010, and a data repository 1112 couple to data storage 1114. As discussed above, data gatherer 602 is configured to gather data from various sources and agents, including agents associated with data center profile module 200-m, utility portals 902, and weather portals 1116. As used herein, a portal is a network-accessible data interface that enables retrieval of data from a corresponding portal host, such as a utility or weather service. A portal may provide a public interface, such as accessible via the Internet or a private interface that supports access via a private network link.

As data is gathered by data gatherer 602, it is stored in data storage 1114 via data repository 1112. Data repository 1112 may also keep a portion of recently collected data in a controller's memory. Statistics engine is configured to perform statistical analysis of data stored by data repository and generate corresponding statistical data, which may also be stored in data repository 1112. For example, statistics module 1010 may be configured to generate average usage levels per daytime interval, producing data from which average usage curves can be generated and/or accessed. More generally, statistics module 1010 may be configured to generate statistical data relating to any data parameter stored in data repository 1112.

Forecast module 1004 is configured to forecast various parameters relating to data center operations for the multiple data centers, such as electrical energy utilization on an hour-by-hour basis, projected utility rates, either fixed-interval or as a function of projected energy utilization. For example, based on statistical data corresponding to historical usage patterns, forecast engine may project a required energy utilization level, a projected energy rate, a projected trigger condition, etc. In addition, if a data center is operating in a region having an energy market that includes a day-ahead market, such as ERCOT, forecast engine may retrieve the day-ahead market rates as those market periods close and use these as actual projected rates as opposed to estimated rates derived from processing the statistical data.

Data transmission cost module 1000 is used to retrieve data transmission cost data from data network providers 1118 and project data transmission costs associate with a virtual server migration, including the cost of moving (copying, typically) data between data centers and/or changes in data transmission costs as a result accessing services from a different data center (after migration), such as changes in transmission costs relating to migrating virtual servers to a data center that is closer to or further from a customer base that uses a service or services relating to the virtual servers that are migrated.

Savings/cost engine 1006 is configured to project operational savings and/or costs relating to performing a virtual server migration, scaling a data center service up or down, or for auction bidding purposes. As discussed above, there typically will be some savings associated with a given migration, as well as costs. These savings and costs are generated by savings/cost engine 1006. For example, savings/cost engine 1106 may be configured to project savings and costs for multiple data center migration scenarios. In addition, savings/cost engine 1106 may be configured to perform cost comparisons relating to scaling services provided by data centers by adding or removing virtual server instances at those data centers.

Energy market auction engine 1002 is configured to interface with an energy market auction portal 1120 and make market bids for energy consumption. Such bids can be made to an energy market ISO if the operator of the data centers is a registered market participant, or may be made to a utility clearinghouse or the like if the energy market does not use an ISO. A typical bid may include a single price/quantity combination, multiple price/quantity combinations resulting in a stepped price/quantity bid curve, are a price/quantity bid curve defined by a mathematical function or a set of price/quantity data points defining a price/quality bid curve. Bids may be made for different types of markets, such as day-ahead markets and "spot" markets (aka, real-time markets, although spot bids proceed the actual rate periods by some predetermined amount of time). Also, the auction bids are typically for a given rate period. The auction bids may be calculated, at least in part, through data generated by savings/cost engine 1006. Auction bid results will be stored in data repository 1112. Depending on the energy market structure and rules, any bid (or portion of a bid) that has a price equal to or above the settlement price for the auction period will be a filled bid, while bids (or portions of bids) having prices below the settlement price will not be filled. Additionally, depending on agreements a data center may have with local utilities, the data center may acquire anywhere from none, a portion, or even all of its power for a given auction period based on the settlement price, with the remaining portion of power (if any) purchased from one or more local utilities.

Migration/Scale decision engine 1008 is configured to process data from various inputs and determine when and how virtual server migrations between data centers should be performed, as well as determining which data centers to add or remove virtual server instances to when scaling services up or down in response to changes in service demands. For example, in response to receiving certain event triggers, migration/scale decision engine 1008 may initiate a virtual server migration, while in response to other event triggers and/or other inputs, migration/scale decision engine 1008 may request additional information from savings/cost engine to determine whether a virtual server migration should be performed.

Figure 12:
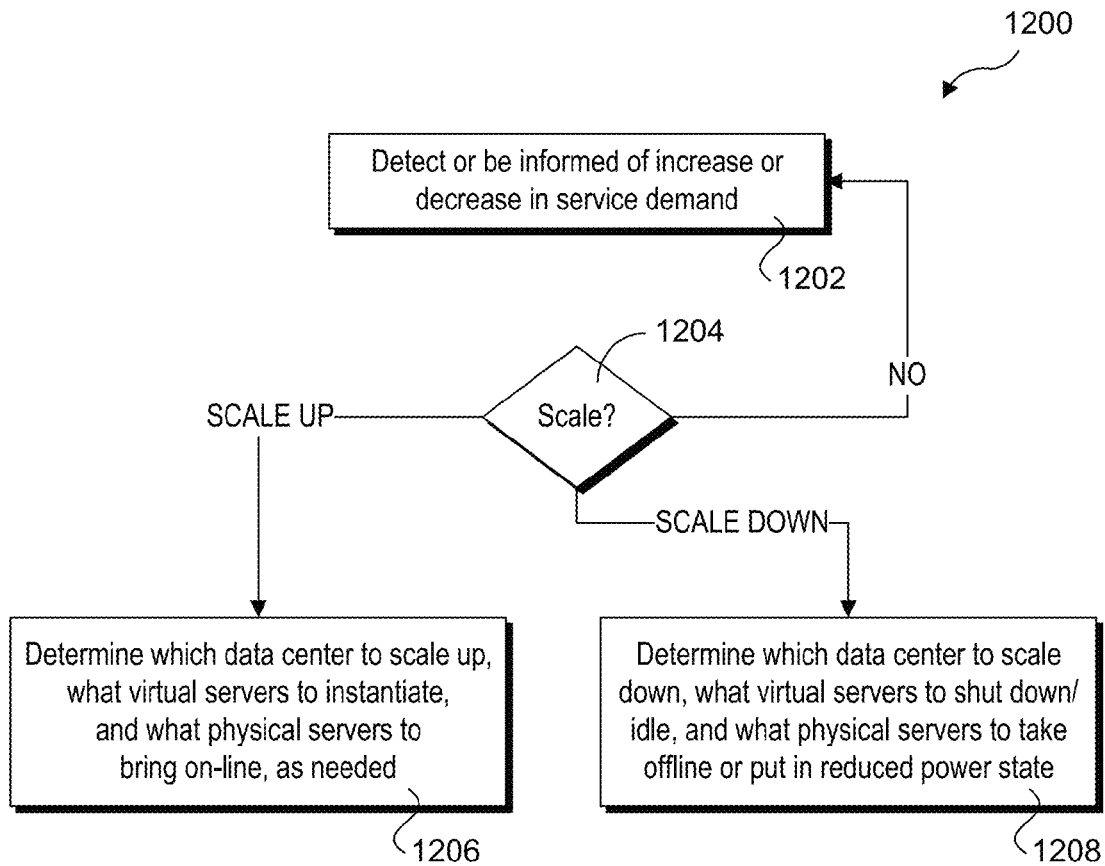
FIG. 12 shows a flowchart 1200 illustrating operations and logic to effect data center service scaling, according to one embodiment.

As discussed above, controller 500 may also be employed to scale services up and down under which virtual servers are added or removed from selected data centers based on various operational and cost considerations. FIG. 12 shows a flowchart 1200 illustrating operations and logic to effect data center service scaling, according to one embodiment. In a block 1202, controller 500 detects or is informed of an increase or decrease in demand for a given service hosted by the data centers. For example, a data center may host its own services, or may be contracted for hosting third-party services; examples of the latter include Amazon Web Services (AWS) and Elastic Compute Cloud (EC2) and some Microsoft Azure services. Information relating to changes in service demand may be determined externally from controller 500, such as determined by transition triggers module 300-M, or may be determined from input data gathered by controller 500. Generally, input from transition triggers module 300-M will correspond to a push model (e.g., a push notification may be sent to controller 500), while data gathered by controller 500 to detect a change in service demand may be acquired through use of a pull and/or push model, as discussed above.

As depicted by a decision block 1204, in response to a SCALE UP determination (e.g., an identified service is to be scaled up), the logic proceeds to a block 1206 in which a determination is made to which data center to scale up, what virtual servers to instantiate, and what physical servers to bring on-line, as needed. For example, migration/scale decision engine 1008 may determine the most cost effective data center to scale based on input from savings/cost engine 1006 and/or other input data. Generally, virtual servers will be configured to support a predetermined service function, such as a Web server function or an application server function. Web server functions are somewhat similar for many different types of services, and some Web servers may be configured to be implemented for supporting multiple services. In contrast, application servers are often tailored to support a specific service. In many cases, the Web server software and application server software will be preinstalled as applications that are configured to run on VMs hosted by physical servers. Adding the virtual servers is commonly referred to as instantiating virtual server instances. Depending on the particular type of scaling to be performed, physical servers may need to be brought on-line; such physical servers may be either in an existing lower-power idle state or completely such down prior to be brought on-line.

As depicted by a SCALE DOWN determination by decision block 1204, the logic proceeds to a block 1208 in which a determination is made to which data center to scale down, what virtual servers to shut down or idle, and what physical servers, if any, to take offline or put in a reduced power state. As before, these determinations may be made by migration/scale decision engine 1008 based on input from savings/cost engine 1006 and/or other input data. In the case of scaling down a service, the data center with the highest operating costs per virtual server will typically be identified to scale down, as opposed to scaling up a service under which the data center with the lowest operating costs per virtual server will be identified.

Controller 500 may be implemented through use of software running on one or more computing machines, including both physical computers, servers, etc., as well as virtual machines running on physical computers and servers. For example, each module or engine depicted in FIG. 11 may comprise a separate software module, component, or set of modules, components, libraries, etc. For explanation purposes, the modules and engines depicted as being implemented by controller 500 have been selected to illustrate an exemplary set of software modules, components, etc. for implementing the overall functionality supported by controller 500. Similar functionality may be supported using a greater or smaller number of software modules and components, and the illustrated set of modules and components is not limiting, but rather merely exemplary.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on virtual machine hosted by a server blade, server module, stand-alone server, etc. or running directly on a processor of a server blade, server module, stand-alone server, etc. Thus, embodiments of this invention may be used as or to support a software program, software modules, firmware, and/or distributed software executed upon some form of processing core (such as a CPU of a computer or server, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computer-implemented method for determining whether to perform a virtual server migration between data centers, each data center having a hierarchy of levels including a data center level, a rack level, a chassis level, a server level, and a virtual machine (VM) level, the rack level including a plurality of racks in which a plurality of server chassis associated with the server chassis level are installed, each server chassis having one or more servers associated with the server level installed, at least a portion of the servers hosting a plurality of VMs associated with the VM level, each VM operating as a virtual server instance, the method comprising:

automatically gathering data to be used as inputs for determining whether to perform a virtual server migration between data centers, the data gathered from each of a plurality of data centers and comprising data that is collected by a plurality of agents implemented at at least three different agent levels in an agent hierarchy, the at least three different agent levels selected from among, a VM agent level associated with agents implemented at the VM level, a server agent level associated with agents implemented at the server level, a rack agent level associated with agents implemented at the rack level, a cluster agent level associated with a cluster of servers, a room level associated with a physical or logical partition of servers in a data center, and a data center level;

wherein the data includes,
data relating to virtual machine utilization;
data relating to electrical utilization costs;
data relating to data center utilization; and
data relating to trigger events;

processing the data that is gathered to determine whether to migrate virtual servers from a first data center to a second data center; and in response to determining to migrate virtual servers from the first data center to the second data, initiating migration of virtual servers from the first data center to the second data center.

2. The computer-implemented method of claim 1, wherein the plurality of agents comprise:

a respective agent for at least one of,
the data center level;
the room level; and
the cluster level; and a respective agent for at least two of,
the server level;
the chassis level; and
the VM level, wherein each of the plurality of agents is configured to implement one or more Application Program Interfaces (APIs) for communicating with at least one of agents at another agent level and a controller that is implemented to process the data that is gathered to determine whether to migrate virtual servers.

3. The method of claim 2, further comprising employing a plurality of agents at a Virtual Machine Manager (VMM) level that are configured to collect data relating to virtual machine utilization, wherein the VMM level pertains to a VMM or hypervisor running on a server at the server level.

4. The method of claim 3, further comprising employing a plurality of agents at the VM level, wherein the plurality of agents at the VM level are configured to communicate VM utilization data to the agent at the VMM level, and the agent at the VMM level is configured to aggregate VM utilization data collected from a plurality of VM agents relating to utilization of VMs hosted by the VMM, and the agent at the VMM level is further configured to communicate the aggregated VM utilization data to at least one of an agent at a lower level and the controller.

5. The method of claim 2, wherein agents at a lower level of the agent hierarchy collect and aggregate data from agents at a higher level of the agent hierarchy.

6. The method of claim 1, wherein determining whether to perform a virtual server migration includes a savings/cost analysis that includes consideration of projected data transmission costs including the cost of transmitting data between the data centers, and changes in transmission costs relating to customer access after the server migration has been completed.

7. The method of claim 1, further comprising,
if it is determined to migrate the virtual servers, automatically initiating a migration of a plurality of virtual servers from the first data center to the second data center, wherein automatically initiating a migration of the plurality of virtual servers includes identifying which virtual server instances to migrate.

8. The method of claim 1, wherein the data relating to electrical utilization costs includes a current cost per energy unit and a current consumption level for each of the plurality of data centers, and a determination to whether to migrate virtual servers includes consideration of the current cost per energy unit and a projected future cost of per energy unit based at least in part on the current consumption level.

9. The method of claim 1, wherein the servers include one or more of a plurality of blade servers and server modules, and wherein the data relating to virtual machine utilization includes a virtual server average power consumption rate aggregated at one or more of a per server blade or server module level, at a blade server or server module chassis level, or at an aggregation of multiple blade server or server module chassis level.

10. The method of claim 1, wherein the data related to trigger events includes at least one of a high energy utilization threshold and a low energy utilization threshold trigger, and wherein in response to an actual or projected crossing of a high energy utilization threshold or a low energy utilization threshold at a given data center, a virtual server migration away from the data center is triggered.

11. The method of claim 1, further comprising employing a data collection cycle under which data is gathered by a controller using one or more of a pull model and a push model, and wherein the data is gathered for each of the data centers and includes data center profile data, local utility data and local weather data.

12. The method of claim 11, wherein the data that is gathered for each data center further includes local environmental data.

13. The method of claim 1, further comprising:
forecasting a future energy consumption level; and
submitting a bid for an energy market auction to purchase energy, wherein the bid includes one or more of a single price/quantity combination, multiple price/quantity combinations resulting in a stepped price/quantity bid curve, a price/quantity bid curve defined by a mathematical function or a set of price/quantity data points defining a price/quality bid curve, and wherein the bid is based, in part, on the future energy consumption level that is forecast.

14. The method of claim 1, further comprising:
in response to a service scaling event, processing the data that is gathered to determine a data center to instantiate additional virtual servers at to support scaling up of the service.

15. A non-transient machine readable medium having a plurality of instructions stored thereon comprising a plurality of modules configured to be executed on at least one computing machine to implement controller operations, comprising:
gathering data to be used as inputs for determining whether to perform a virtual server migration between data centers, each data center having a hierarchy of levels including a data center level, a rack level, a chassis level, a server level, a virtual machine monitor (VMM) level and a virtual machine (VM) level, the rack level including a plurality of racks in which a plurality of server chassis associated with the server chassis level are installed, each server chassis having one or more servers associated with the server level installed, at least a portion of the servers running a virtual machine monitor (VMM) or hypervisor operating at the VMM level and hosting a plurality of VMs associated with the VM level, each VM operating as a virtual server instance, the data gathered from each of a plurality of data centers and comprising data that is collected by a plurality of agents implemented at at least three different agent levels in an agent hierarchy, the at least three different agent levels selected from among,
a VM agent level associated with agents implemented at the VM level, a VMM agent level associated with agents implemented at the VMM level, a server agent level associated with agents implemented at the server level, a rack agent level associated with agents implemented at the rack level, a cluster agent level associated with a cluster of servers, a room level associated with a physical or logical partition of servers in a data center, and a data center level, wherein the data includes,
data relating to virtual machine utilization;
data relating to electrical utilization costs;
data relating to data center utilization; and
data relating to triggers events;
processing the data that is gathered to determine whether to migrate virtual servers from a first data center to a second data center; and
in response to determining to migrate virtual servers from the first data center to the second data, initiating migration of virtual servers from the first data center to the second data center.

16. The non-transient machine readable medium of claim 15, wherein the plurality of modules includes:
a data gather module, configured to at least one of collect and receive data from a plurality of agents and gather data via a plurality of portals, including utility portals configured to provide access to electrical energy data and weather portals configured to provide access to weather data;
an event handler, configured to at least one of collect and receive data related to data center operating conditions and events,
wherein the controller employs the event handler, at least in part, in determining whether a server migration between the first and second data centers is triggered.

17. The non-transient machine readable medium of claim 16, wherein the plurality of modules includes:
a data repository module, configured to store data gathered by the data gatherer;
a statistics module, configured to perform statistical operations on the data stored by the data repository module to generate data center operations statistics data; and a forecast module, configured to forecast future data center operation parameters based on the data center operations statistics data.

18. The non-transient machine readable medium of claim 16, wherein the plurality of modules includes:
a migration/scale decision engine, configured to,
receive input data relating to data center operations, events, and costs; and
process the input data to determine whether a virtual server migration between data centers is to be performed; and
process the input data to determine if a service is to be scaled by adding virtual servers and identify which of the plurality of data centers the addition virtual servers are to be added.

19. The non-transient machine readable medium of claim 16, wherein the plurality of modules includes:
a data transmission cost module, configured to determine a data transmission cost relating to performing a virtual server migration between data centers, including the cost of transmitting data between the data centers, and changes in transmission costs relating to customer access after the server migration has been completed.

20. The non-transient machine readable medium of claim 16, wherein the plurality of modules includes:
a savings/cost engine, configured to receive a plurality of inputs relating to data center operations and server migration costs and project estimated operational savings and costs related to a virtual server migration between data centers.

21. The non-transient machine readable medium of claim 16, wherein the plurality of modules includes:
an energy market auction bid module, configured to interface to an energy market auction portal and submit energy market auction bids including one or more of a single price/quantity combination, multiple price/quantity combinations resulting in a stepped price/quantity bid curve, a price/quantity bid curve defined by a mathematical function or a set of price/quantity data points defining a price/quality bid curve.

* * * * *